(12) United States Patent  
Suginami

(10) Patent No.: US 11,991,996 B2  
(45) Date of Patent: May 28, 2024

(54) FISHING REEL

(71) Applicant: BLUE BOARD LTD., Yokohama (JP)

(72) Inventor: Yasuyuki Suginami, Yokohama (JP)

(73) Assignee: BLUE BOARD LTD., Yokohama (JP)

( * ) Notice: Subject to any disclaimer, the term of this patent is extended or adjusted under 35 U.S.C. 154(b) by 0 days.

(21) Appl. No.: 17/975,130

(22) Filed: Oct. 27, 2022

(65) Prior Publication Data

US 2023/0172179 A1    Jun. 8, 2023

(30) Foreign Application Priority Data

Sep. 6, 2021   (JP) ................................ 2021-144474
Sep. 6, 2021   (JP) ................................ 2021-144490

(51) Int. Cl.
  *A01K 89/01*   (2006.01)
  *A01K 89/00*   (2006.01)
  *A01K 89/017*  (2006.01)

(52) U.S. Cl.
  CPC .......... *A01K 89/004* (2015.05); *A01K 89/006* (2013.01); *A01K 89/017* (2013.01)

(58) Field of Classification Search
  CPC ................ A01K 89/006; A01K 89/017; A01K 89/0173; A01K 89/0183; A01K 89/0186; A01K 89/01902; A01K 89/01923
  See application file for complete search history.

(56) References Cited

U.S. PATENT DOCUMENTS

| 2,262,637 A | * | 11/1941 | Fanshier | A01K 89/0189 242/260 |
| 2,714,271 A | * | 8/1955 | Stratton | A01K 89/0183 242/249 |
| 3,077,318 A | * | 2/1963 | Morris | A01K 89/017 242/250 |
| 4,021,003 A | * | 5/1977 | Watkins | A01K 89/017 242/270 |
| 4,598,878 A | | 7/1986 | Steffan | |

(Continued)

FOREIGN PATENT DOCUMENTS

CN    100571509 C   * 12/2009
JP    H03-187330 A    8/1991

(Continued)

OTHER PUBLICATIONS

Nov. 2, 2021 Office Action issued in Japanese Patent Application No. 2021-144474.

(Continued)

*Primary Examiner* — Emmanuel M Marcelo
(74) *Attorney, Agent, or Firm* — Oliff PLC

(57) ABSTRACT

A fishing reel includes: a reel body; a spool supported by the reel body so as to be rotatable; a handle attached to the reel body so as to be rotatable; a first rotation transmission mechanism that transmits, to the spool, a driving force due to rotation of the handle; a motor power unit that generates a driving force that rotates the spool; a second rotation transmission mechanism that transmits the driving force of the motor power unit to the spool; and an operation unit that is disposed outside the reel body and changes the driving force of the motor power unit, wherein the operation unit is configured to be set at a position desired by a user so as to be usable.

11 Claims, 11 Drawing Sheets

(56) References Cited

U.S. PATENT DOCUMENTS

| | | | | |
|---|---|---|---|---|
| 7,269,922 | B1* | 9/2007 | Mack | A01K 89/017 242/227 |
| 9,661,835 | B1* | 5/2017 | Sandstrom | A01K 89/017 |
| 2011/0209383 | A1* | 9/2011 | Tennyson | A01K 89/017 242/250 |
| 2015/0033611 | A1* | 2/2015 | Hamilton, II | A01K 85/01 43/17 |

FOREIGN PATENT DOCUMENTS

| | | |
|---|---|---|
| JP | H07-067508 A | 3/1995 |
| JP | 2002-034402 A | 2/2002 |
| JP | 2004-065071 A | 3/2004 |
| JP | 3159594 U | 5/2010 |
| JP | 2016-000028 A | 1/2016 |
| JP | 2016-086657 A | 5/2016 |
| JP | 2017-30112 A | 2/2017 |
| JP | 2020-058250 A | 4/2020 |

OTHER PUBLICATIONS

Nov. 2, 2021 Office Action issued in Japanese Patent Application No. 2021-144490.

Dec. 22, 2023 Office Action issued in Japanese Patent Application No. 2022-019154.

\* cited by examiner ically, as fishing reels, there are manual reels

FISHING REEL

REFERENCE TO RELATED APPLICATIONS

This application is based upon and claims the benefit of priority from Japanese Patent Applications No. 2021-144474 and No. 2021-144490 both filed on Sep. 6, 2021, the entire contents of which, including descriptions, scopes of claims and drawings, are incorporated herein by reference.

TECHNICAL FIELD

The present disclosure relates to fishing reels.

BACKGROUND ART

Conventionally, as fishing reels, there are manual reels and electric reels on the market, and users appropriately use these in accordance with fishing methods (fishing contraptions) for fishes to catch and for depths where fishes to catch are present.

For example, a manual reel includes a spool (winder) provided on a reel body so as to be rotatable, a handle attached to the reel body so as to be rotatable, and a handle rotation transmission mechanism that transmits, to the spool, driving force due to the handle being rotated.

An electric reel includes, in addition to the components of the manual reel described above, a motor built in the reel body and a motor rotation transmission mechanism that transmits driving force of the motor to the spool. (See, for example, JP 2002-34402 A or JP 2016-86657 A.)

SUMMARY OF INVENTION

In the case of the electric reel disclosed in JP 2002-34402 A, a push button provided on the reel body is operated to adjust the winding speed or the like of the electric reel.

When a big fish is caught and hence a user cannot unhand his/her rod, it may be difficult for the user to operate the push button of an electric reel.

The present inventor therefore has studied eagerly and developed an electric reel with excellent operability.

Objects of the present disclosure include providing a fishing reel(s) that can be used appropriately.

In order to achieve any of the objects, according to a first aspect of the present disclosure, there is provided a fishing reel including:
  a reel body;
  a spool supported by the reel body so as to be rotatable;
  a handle attached to the reel body so as to be rotatable;
  a first rotation transmission mechanism that transmits, to the spool, a driving force due to the handle being rotated;
  a motor power unit that generates a driving force that rotates the spool;
  a second rotation transmission mechanism that transmits the driving force of the motor power unit to the spool; and
  an operation unit that is disposed outside the reel body and changes the driving force of the motor power unit,
  wherein the operation unit is configured to be set at a position desired by a user so as to be usable.

In order to achieve any of the objects, according to a second aspect of the present disclosure, there is provided a fishing reel including:
  a reel body;
  a spool supported by the reel body so as to be rotatable;
  a handle attached to one end side of the reel body so as to be rotatable;
  a motor power unit that has a coupling part attachable to and detachable from a coupling counterpart disposed on other end side of the reel body and is disposed outside the reel body;
  a first rotation transmission mechanism that transmits, to the spool, a driving force due to the handle being rotated;
  a second rotation transmission mechanism that transmits, to the spool, a driving force of the motor power unit input therefrom through the coupling part coupled with the coupling counterpart; and
  an operation unit that is disposed outside the reel body and changes the driving force of the motor power unit,
  wherein the operation unit is configured to be set at a position desired by a user so as to be usable.

In order to achieve any of the objects, according to a third aspect of the present disclosure, there is provided a fishing reel including:
  a reel body;
  a spool supported by the reel body so as to be rotatable;
  a handle attached to one end side of the reel body so as to be rotatable;
  a motor power unit that has a coupling part attachable to and detachable from a coupling counterpart disposed on other end side of the reel body and is disposed outside the reel body;
  a first rotation transmission mechanism that transmits, to the spool, a driving force due to the handle being rotated; and
  a second rotation transmission mechanism that transmits, to the spool, a driving force of the motor power unit input therefrom through the coupling part coupled with the coupling counterpart,
  wherein a magnet is disposed on one of the coupling part and the coupling counterpart, and a magnet or a ferromagnetic material is disposed on other thereof.

BRIEF DESCRIPTION OF DRAWINGS

The advantages and features provided by one or more embodiments of the present disclosure will become more fully understood from the detailed description given hereinbelow and the appended drawings that are given by way of illustration only, and thus are not intended as a definition of the limits of the present disclosure.

DETAILED DESCRIPTION

Hereinafter, an embodiment(s) of a fishing reel according to the present disclosure will be described in detail with reference to the drawings. Although various limitations that are technically favorable for carrying out the present disclosure are put on the following embodiment(s), the technical scope of the present disclosure is not limited to the following embodiment(s) or illustrated examples.

Figure 1A:
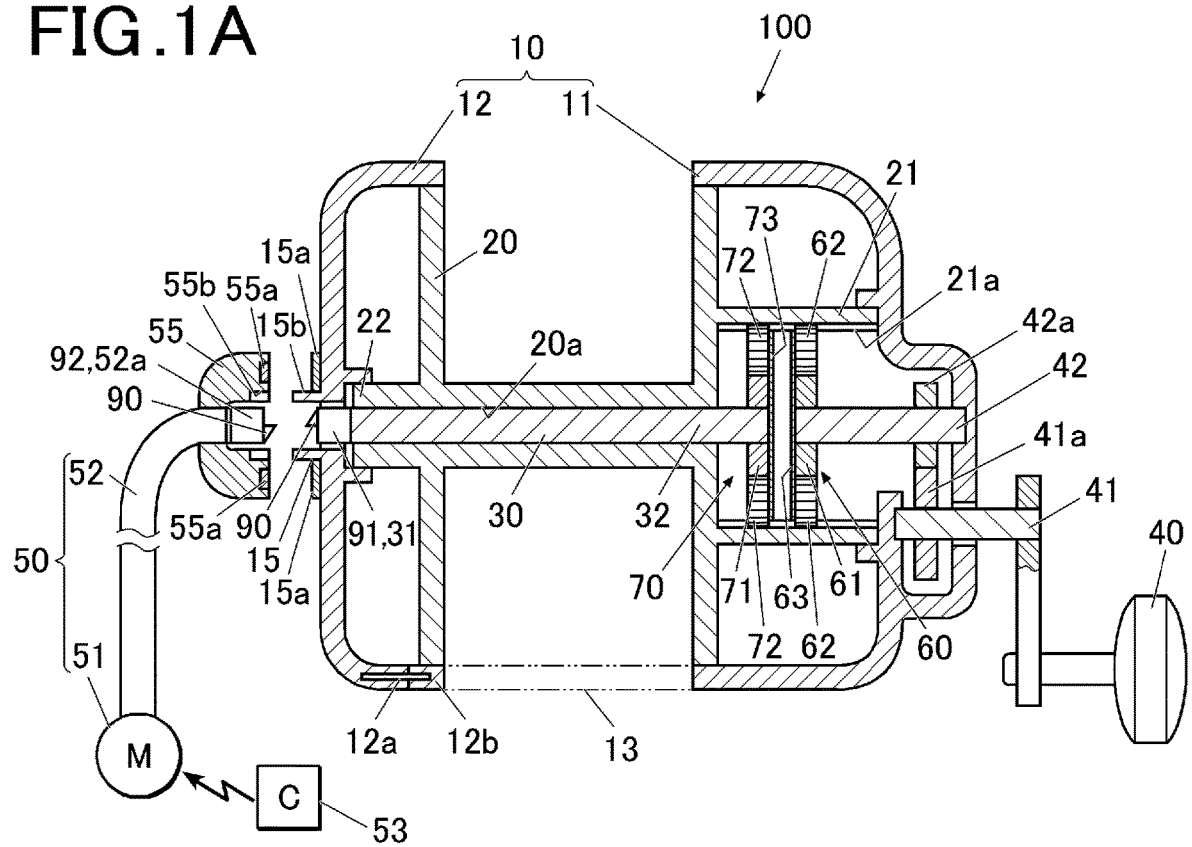
FIG. 1A is a sectional view of a fishing reel of an embodiment(s), showing a mode as a manual reel.
Figure 1B:
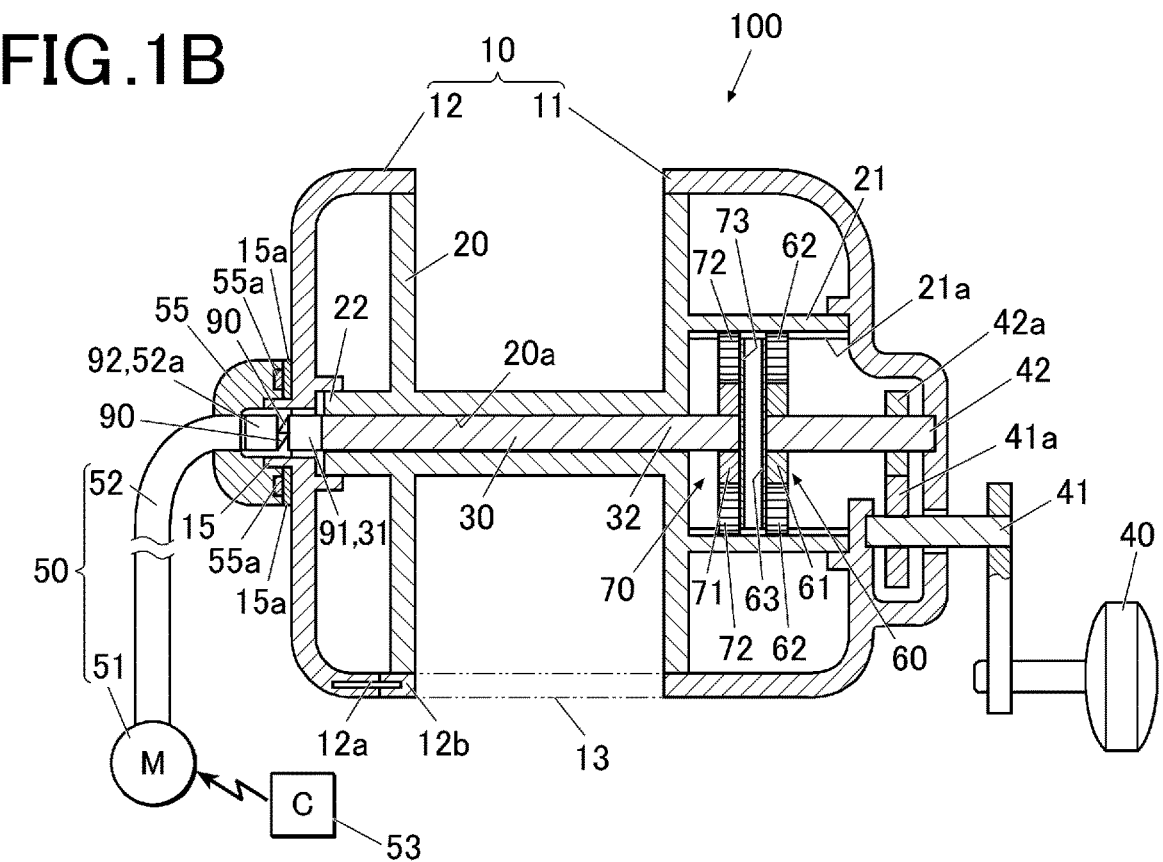
FIG. 1B is a sectional view of the fishing reel of the embodiment, showing a mode as an electric reel.

A fishing reel 100 of an embodiment(s) includes, for example, as shown in FIG. 1A and FIG. 1B, a reel body 10, a spool 20 supported by the reel body 10 so as to be rotatable, a handle 40 attached to one end side of the reel body 10 so as to be rotatable, a motor power unit 50 having a coupling part 55 attachable to and detachable from a coupling counterpart 15 provided on the other end side of the reel body 10, a first rotation transmission mechanism 60 that transmits, to the spool 20, driving force due to the handle 40 being rotated, and a second rotation transmission mechanism 70 that transmits, to the spool 20, driving force of the motor power unit 50 input therefrom through the coupling part 55 coupled with the coupling counterpart 15.

The motor power unit 50 is disposed outside the reel body 10.

Also, a controller 53 for changing the driving force of the motor power unit 50 is disposed outside the reel body 10.

The fishing reel 100 further includes a spool shaft 30. The spool shaft 30 is inserted, so as to be rotatable, in a hollow portion 20a provided along the axis of the spool 20, and its one end 31 is disposed so as to be exposed from the reel body 10 to the outside. The motor power unit 50 is attached/detached to/from the one end 31 of the spool shaft 30.

The spool shaft 30 constitutes part of the second rotation transmission mechanism 70.

The driving force of the motor power unit 50 is input and transmitted to the spool 20 through the spool shaft 30 of the second rotation transmission mechanism 70.

The handle 40 is attached to the other end 32 side of the spool shaft 30.

The reel body 10 includes a first body 11 that supports one end side 21 of the spool 20 and a second body 12 that supports the other end side 22 of the spool 20.

The first body 11 and the second body 12 are joined by a third body 13, thus being assembled into one body.

The handle 40 is attached to the first body 11 that forms the one end side of the reel body 10.

The coupling counterpart 15 is provided on the second body 12 that forms the other end side of the reel body 10. The coupling part 55 of the motor power unit 50 is coupled with the coupling counterpart 15.

The first rotation transmission mechanism 60 and the second rotation transmission mechanism 70 are disposed on the first body 11 side in the reel body 10.

The spool 20 is detachable from the reel body 10 as described later.

A not-shown fishing line (line) is tied to and wound around the spool 20.

The spool shaft 30 is a rotary shaft inserted in the hollow portion 20a, which is provided along the axis of the spool 20, so as to be rotatable. The spool shaft 30 functions as part of the second rotation transmission mechanism 70.

The one end 31 of the spool shaft 30 is disposed so as to be exposed from the coupling counterpart 15 provided on the second body 12 of the reel body 10, and the other end 32 of the spool shaft 30 is disposed on the first body 11 side.

On the one end 31 of the spool shaft 30, a clutch member 91, described later, is disposed.

On the other end 32 of the spool shaft 30 disposed on the first body 11 side, the second rotation transmission mechanism 70 is disposed.

The second rotation transmission mechanism 70 disposed on the other end 32 of the spool shaft 30 transmits the driving force of the motor power unit 50 to the one end side 21 of the spool 20.

The handle 40 is attached to the first body 11 of the reel body 10.

More specifically, the handle 40 is attached to a first handle shaft 41 provided with a first gear 41a, and the first rotation transmission mechanism 60 is disposed on a second handle shaft 42 provided with a second gear 42a meshing with the first gear 41a.

Turning force that rotates the handle 40 is transmitted to the first handle shaft 41, the first gear 41a, the second gear 42a, the second handle shaft 42 and the first rotation transmission mechanism 60 in this order.

The first rotation transmission mechanism 60 disposed on an end of the second handle shaft 42 transmits the driving force due to the handle 40 being rotated to the one end side 21 of the spool 20.

The first handle shaft 41, the first gear 41a, the second gear 42a and the second handle shaft 42 function as part of the first rotation transmission mechanism 60.

The motor power unit 50 includes, for example, a motor 51, a flexible shaft 52 and the controller 53 connected to the motor 51, the coupling part 55, and a not-shown power source. The motor 51 and the controller 53 of the motor power unit 50 are waterproof.

The controller 53 is an operation unit that turns on and off the motor 51 and changes the driving force thereof. The controller 53 is set at a position desired by its user so as to be usable.

The coupling part 55 is provided on an end side of the flexible shaft 52 opposite to an end side thereof to which the motor 51 is connected. The coupling part 55 is coupled with the coupling counterpart 15 of the reel body 10 (second body 12).

The flexible shaft 52 is a well-known long flexible component that transmits the rotational power of the motor 51 to a distant position, and its end 52a is rotated by the drive of the motor 51. The end 52a of the flexible shaft 52 can be engaged with the one end 31 of the spool shaft 30.

More specifically, a clutch member 92, described later, is disposed on the end 52a of the flexible shaft 52, and can be engaged with the clutch member 91 on the one end 31 of the spool shaft 30.

The clutch member 92 disposed on the end of the flexible shaft 52 is disposed in a manner of being exposed from an opening of the coupling part 55 provided on the end side of the flexible shaft 52.

The length of the flexible shaft 52 is arbitrary, and hence the flexible shaft 52 to be used has a length suitable for a position where the motor 51 is set by the user.

The controller 53 includes a module conforming to a wireless communication standard, such as Bluetooth®.

The motor power unit 50 (motor 51) includes a module of the same type as the above, and the controller 53 can control the motor power unit 50 (motor 51) remotely.

More specifically, with the controller 53, operations to turn on and off the motor 51 and to change the driving force of the motor 51 can be made.

Figure 2A:
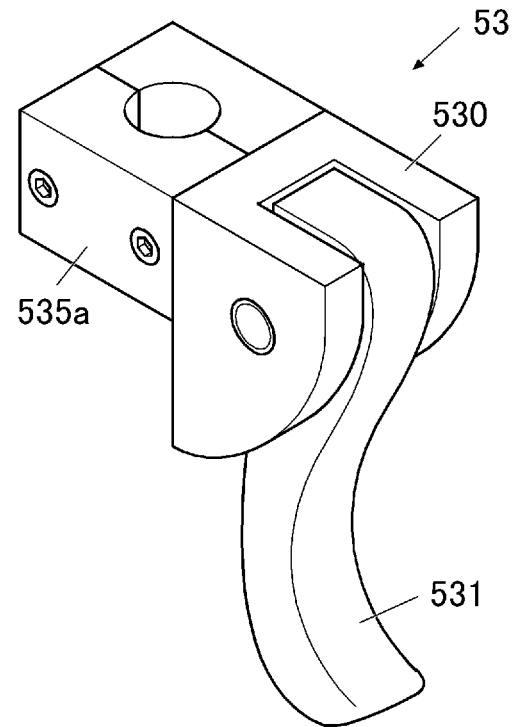
FIG. 2A is a perspective view of a controller of the fishing reel of the embodiment, showing a type provided with a throttle lever.
Figure 2B:
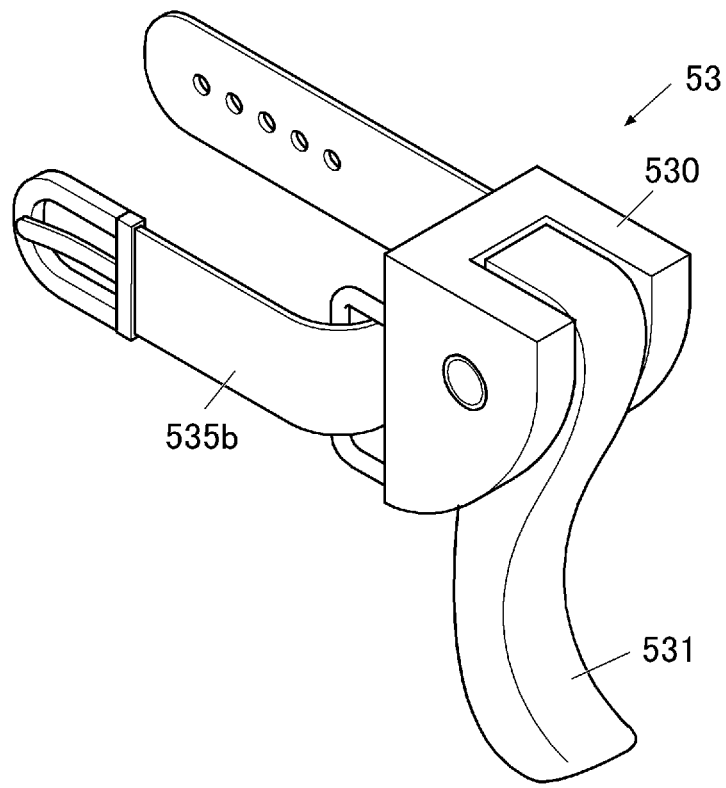
FIG. 2B is a perspective view of a controller of the fishing reel of the embodiment, showing the type provided with a throttle lever.
Figure 3A:
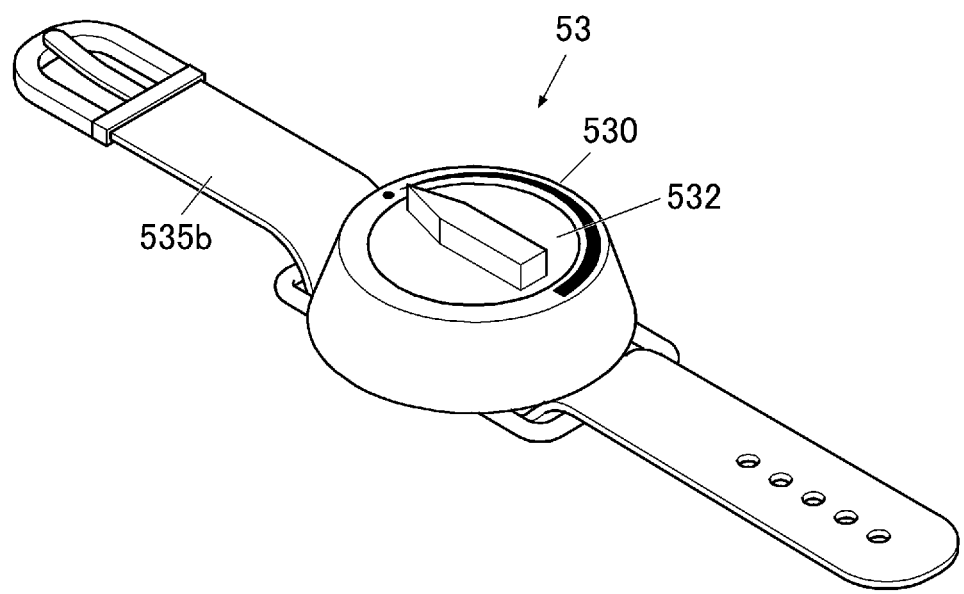
FIG. 3A is a perspective view of a controller of the fishing reel of the embodiment, showing a type provided with a dial.
Figure 3B:
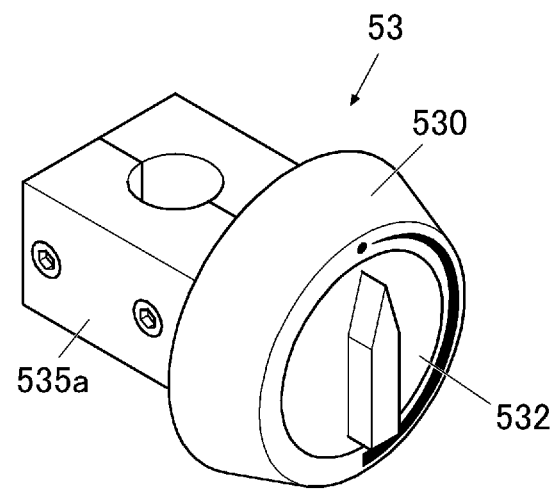
FIG. 3B is a perspective view of a controller of the fishing reel of the embodiment, showing the type provided with a dial.
Figure 4A:
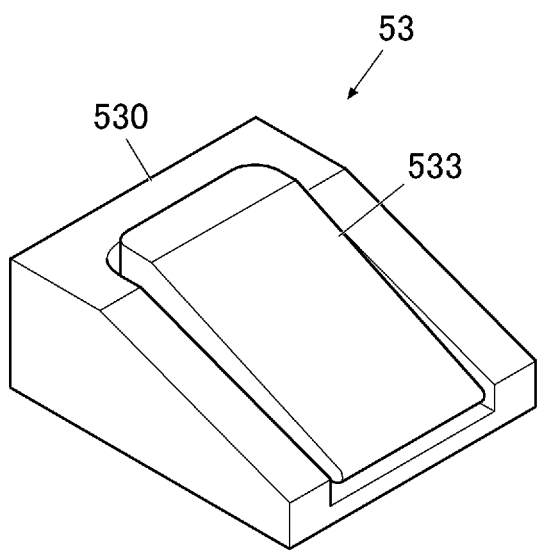
FIG. 4A is a perspective view of a controller of the fishing reel of the embodiment, showing a type provided with a push switch.
Figure 4B:
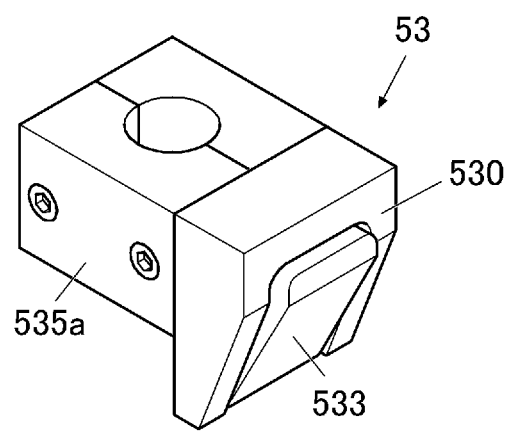
FIG. 4B is a perspective view of a controller of the fishing reel of the embodiment, showing the type provided with a push switch.
Figure 4C:
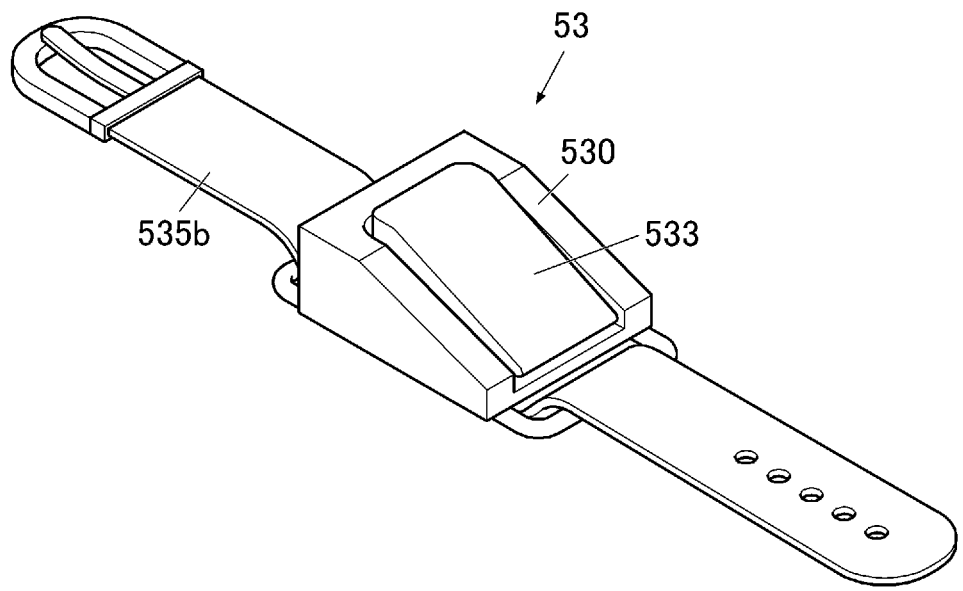
FIG. 4C is a perspective view of a controller of the fishing reel of the embodiment, showing the type provided with a push switch.

Examples of the controller 53 of the fishing reel 100 of this embodiment to be used include a throttle-lever controller 53 shown in FIG. 2A and FIG. 2B, a dial controller 53 shown in FIG. 3A and FIG. 3B, and a push-switch controller 53 shown in FIG. 4A, FIG. 4B and FIG. 4C.

The throttle-lever controller 53 includes, for example, a throttle lever 531 for adjusting the driving force of the motor power unit 50 (motor 51) as shown in FIG. 2A and FIG. 2B.

More specifically, this controller 53 includes an operation-unit body 530 having a wireless communication module and a power source (both not shown) built-in and the throttle lever 531 disposed on the operation-unit body 530 so as to be rotationally movable.

The throttle-lever controller 53 can drive the motor 51 with the throttle lever 531 being gripped and rotationally moved in a predetermined direction, and can change the driving force of the motor 51 according to the draw amount of the throttle lever 531 that is gripped.

In other words, the throttle-lever controller 53 can increase the driving force (rotational frequency) of the motor 51 as the throttle lever 531 is gripped strongly, and decrease the driving force (rotational frequency) of the motor 51 as the throttle lever 531 is gripped weakly.

The throttle lever 531 of the controller 53 is a spring switch. When a hand is removed from the throttle lever 531, the throttle lever 531 returns to a zero point, and the motor 51 stops.

Thus, this controllers 53 can perform stepless adjustment of the driving force of the motor 51.

The controller 53 shown in FIG. 2A is provided with a fastened-by-bolt setting component 535a for attaching and setting the controller 53 to and on a rod.

The controller 53 shown in FIG. 2B is provided with a band-shaped setting component 535b for attaching and setting the controller 53 to and on a rod, a user's wrist or the like.

In other words, the throttle-lever controller 53 can be attached to a rod if the user wants to use it set on the rod, and can be attached to a user's wrist if the user wants to use it set on his/her wrist.

The dial controller 53 includes, for example, a dial 532 for adjusting the driving force of the motor power unit 50 (motor 51) as shown in FIG. 3A and FIG. 3B.

More specifically, this controller 53 includes an operation-unit body 530 having a wireless communication module and a power source (both not shown) built-in and the dial 532 disposed on the operation-unit body 530 so as to be rotatable.

The dial controller 53 can drive the motor 51 with the dial 532 being rotated in a predetermined direction, and can change the driving force of the motor 51 according to the rotational movement amount of the dial 532 that is turned.

In other words, the dial controller 53 can increase the driving force (rotational frequency) of the motor 51 as the dial 532 is rotated clockwise, and decrease the driving force (rotational frequency) of the motor 51 as the dial 532 is rotated counterclockwise.

The dial 532 of the controller 53 is, what is called, a volume switch. A driving force (rotational frequency) corresponding to a position where the dial 532 is stopped can be kept, and hence the motor 51 can keep being driven by (with) a desired driving force (rotational frequency). To stop the motor 51, the dial 532 is brought back to a zero point.

Thus, the controller 53 can perform stepless adjustment of the driving force of the motor 51.

The controller 53 shown in FIG. 3A is provided with a band-shaped setting component 535b for attaching and setting the controller 53 to and on a rod, a user's wrist or the like.

The controller 53 shown in FIG. 3B is provided with a fastened-by-bolt setting component 535a for attaching and setting the controller 53 to and on a rod.

In other words, the dial controller 53 can be attached to a rod if the user wants to use it set on the rod, and can be attached to a user's wrist if the user wants to use it set on his/her wrist.

The push-switch controller 53 includes, for example, a push switch 533 for adjusting the driving force of the motor power unit 50 (motor 51) as shown in FIG. 4A, FIG. 4B and FIG. 4C.

More specifically, this controller 53 includes an operation-unit body 530 having a wireless communication module and a power source (both not shown) built-in and the push switch 533 disposed on the operation-unit body 530 so as to be able to emerge therefrom and retract therein.

The push-switch controller 53 can drive the motor 51 with the push switch 533 being pushed, and can change the driving force of the motor 51 according to the push amount of the push switch 533 that is pushed.

In other words, the push-switch controller 53 can increase the driving force (rotational frequency) of the motor 51 as the push switch 533 is pushed deep, and decrease the driving force (rotational frequency) of the motor 51 as the push switch 533 is pushed lightly.

The push switch 533 of the controller 53 is a spring switch. When a hand or a foot is removed from the push switch 533, the push switch 533 returns to a zero point, and the motor 51 stops.

Thus, this controller 53 can perform stepless adjustment of the driving force of the motor 51.

The controller 53 shown in FIG. 4A is provided with a nonskid component (not shown) on its lower surface. The nonskid component adheres to a floor.

The controller 53 shown in FIG. 4B is provided with a fastened-by-bolt setting component 535a for attaching and setting the controller 53 to and on a rod.

The controller 53 shown in FIG. 4C is provided with a band-shaped setting component 535b for attaching and setting the controller 53 to and on a rod, a user's wrist or the like.

In other words, the push-switch controller 53 can be placed on a floor if the user wants to use it set on the floor, can be attached to a rod if the user wants to use it set on the rod, and can be attached to a user's wrist if the user wants to use it set on his/her wrist.

It is preferable that the push-switch controller 53 for being set on a floor shown in FIG. 4A have a larger shape than the push-switch controllers 53 provided with the setting components 535a, 535b shown in FIG. 4B and FIG. 4C, respectively.

Since the push-switch controller 53 for being set on a floor is operated with a foot, it is preferable that the controller 53 have a length and a width of about 10 cm to 20 cm, for example.

In contrast, it is preferable that the push-switch controllers 53 for being attached to a rod or a wrist to be used have a length and a width of about 3 cm to 6 cm, for example.

These push-switch controllers 53 are different in size but have the same function.

The fishing reel 100 includes at least one of the controllers 53 described above.

The number of controllers 53 included in the fishing reel 100 of this embodiment is not limited to one. The fishing reel 100 may include a plurality of controllers 53.

For example, if the fishing reel 100 includes the controllers 53 shown in FIG. 2A and FIG. 2B, the controllers 53 shown in FIG. 3B and FIG. 3A, or the controllers 53 shown in FIG. 4B and FIG. 4C, fishing can be done with one of the controllers 53 set on a rod and the other of the controllers 53 worn on a wrist.

Thereby, the driving force of the motor 51 can be changed by the user using one of the controllers 53 that is easy for the user to operate at the time.

The controllers 53 included in the fishing reel 100 are not limited to controllers 53 of the same type, but may be controllers 53 of different types.

More specifically, the controllers 53 included in the fishing reel 100 may be any combination of controllers 53 selected from the throttle-lever controller 53, the dial controller 53 and the push-switch controller 53.

For example, if the fishing reel 100 includes the controllers 53 shown in FIG. 2A, FIG. 3A and FIG. 4A, fishing can be done with the controllers 53 set on a rod, a user's wrist and a floor, respectively.

Thereby, the driving force of the motor 51 can be changed by the user using one of the controller 53 that is easy for the user to operate at the time.

The fishing reel 100 may have an operation button(s) for changing the driving force of the motor 51 and so forth on the reel body 10 in addition to the controller(s) 53 for remote control.

The controller(s) 53 is not limited to the above-described controllers 53 of the wireless type, but may be a controller(s) 53 of the wired type connected to the motor 51 through a cable(s).

The first rotation transmission mechanism 60 is a planetary gear mechanism, and includes a sun gear 61 fixed to an end of the second handle shaft 42, a plurality of planetary gears 62 and a planetary carrier 63.

In this embodiment, as described above, the first handle shaft 41, the first gear 41a, the second gear 42a and the second handle shaft 42 are regarded as part of the components of the first rotation transmission mechanism 60.

The first rotation transmission mechanism 60 (planetary gears 62) meshes with a ring gear 21a provided on the one end side 21 of the spool 20. The ring gear 21a can be said as one of the components of the first rotation transmission mechanism 60 (planetary gear mechanism). The first rotation transmission mechanism 60 of this embodiment is a star-type planetary gear mechanism.

Between the sun gear 61 and the second handle shaft 42, a one-way clutch (not shown), such as a one-way bearing, is disposed. This one-way clutch can transmit the turning force in one direction of the handle 40 to the spool 20 and block turning force in the opposite direction.

The second rotation transmission mechanism 70 is a planetary gear mechanism, and includes a sun gear 71 fixed to the other end 32 of the spool shaft 30, a plurality of planetary gears 72 and a planetary carrier 73.

In this embodiment, as described above, the spool shaft 30 is regarded as part of the components of the second rotation transmission mechanism 70.

The second rotation transmission mechanism 70 (planetary gears 72) meshes with the ring gear 21a provided on the one end side 21 of the spool 20. The ring gear 21a can be said as one of the components of the second rotation transmission mechanism 70 (planetary gear mechanism). The second rotation transmission mechanism 70 of this embodiment is a star-type planetary gear mechanism.

Between the sun gear 71 and the spool shaft 30, a one-way clutch (not shown), such as a one-way bearing, is disposed. This one-way clutch can transmit the turning force in one direction of the motor power unit 50 to the spool 20 and block turning force in the opposite direction.

The clutch member 91 on the one end 31 of the spool shaft 30 (rotary shaft), which is part of the components of the second rotation transmission mechanism 70, is disposed in a manner of being exposed from an opening of the coupling counterpart 15 provided on the reel body 10 (second body 12).

The coupling part 55 is, for example, a disc-shaped component provided on the end 52a side of the flexible shaft 52, and the clutch member 92 on the flexible shaft 52 is exposed from the opening of the coupling part 55 as shown in FIG. 1A, FIG. 1B, FIG. 5A and FIG. 5B.

The coupling part 55 is provided with magnets 55a to couple the coupling counterpart 15.

The magnets 55a disposed on the coupling part 55 are, for example, neodymium magnets, and disposed at equal intervals around the opening of the coupling part 55. (For example, four magnets are disposed at positions of three o'clock, six o'clock, nine o'clock and twelve o'clock.)

The opening portion of the coupling part 55 is provided with an annular recess 55b as an insertion-engagement recess. A tubular projection 15b of the coupling counterpart 15 is inserted in and engaged with the annular recess 55b.

The coupling counterpart 15 is, for example, provided on the second body 12 of the reel body 10, and the clutch member 91 on the one end 31 of the spool shaft 30 is exposed from the opening of the coupling counterpart 15 as shown in FIG. 1A, FIG. 1B, FIG. 5A and FIG. 5B.

The coupling counterpart 15 is provided with a ferromagnetic material 15a to be coupled to the coupling part 55.

The ferromagnetic material 15a disposed on the coupling counterpart 15 is, for example, an annular iron plate, and disposed so as to surround the opening of the coupling counterpart 15.

The opening portion of the coupling counterpart 15 is provided with the tubular projection 15b as an insertion-engagement projection. The tubular projection 15b is inserted in and engaged with the annular recess 55b of the coupling part 55.

Since the ferromagnetic material 15a is disposed on the coupling counterpart 15 on the second body 12 of the reel body 10, and the magnets 55a are disposed on the coupling part 55 on the flexible shaft 52 of the motor power unit 50, the coupling part 55 can be easily coupled with the coupling counterpart 15 by magnetic force of the magnets 55a, and also the coupling part 55 and the coupling counterpart 15 can be easily decoupled from one another.

In other words, the coupling part 55 and the coupling counterpart 15 that are coupled magnetically are attachable to and detachable from one another.

Further, the coupling part 55 is provided with the annular recess 55b, the coupling counterpart 15 is provided with the tubular projection 15b, and when the coupling part 55 and the coupling counterpart 15 are coupled with one another, the tubular projection 15b of the coupling counterpart 15 is inserted in and engaged with the annular recess 55b of the coupling part 55. Hence, the coupling part 55 and the coupling counterpart 15 coupled magnetically are less likely to slip out of place.

In other words, the tubular projection 15b is inserted in and engaged with the annular recess 55b in a state in which the coupling part 55 and the coupling counterpart 15 are coupled with one another, thus stabilizing the coupling of the coupling part 55 and the coupling counterpart 15.

Even if the point where the coupling part 55 and the coupling counterpart 15 are coupled hits something, or something hits the point where the coupling part 55 and the coupling counterpart 15 are coupled, the coupling part 55 is not decoupled from the coupling counterpart 15 easily.

Figure 6:
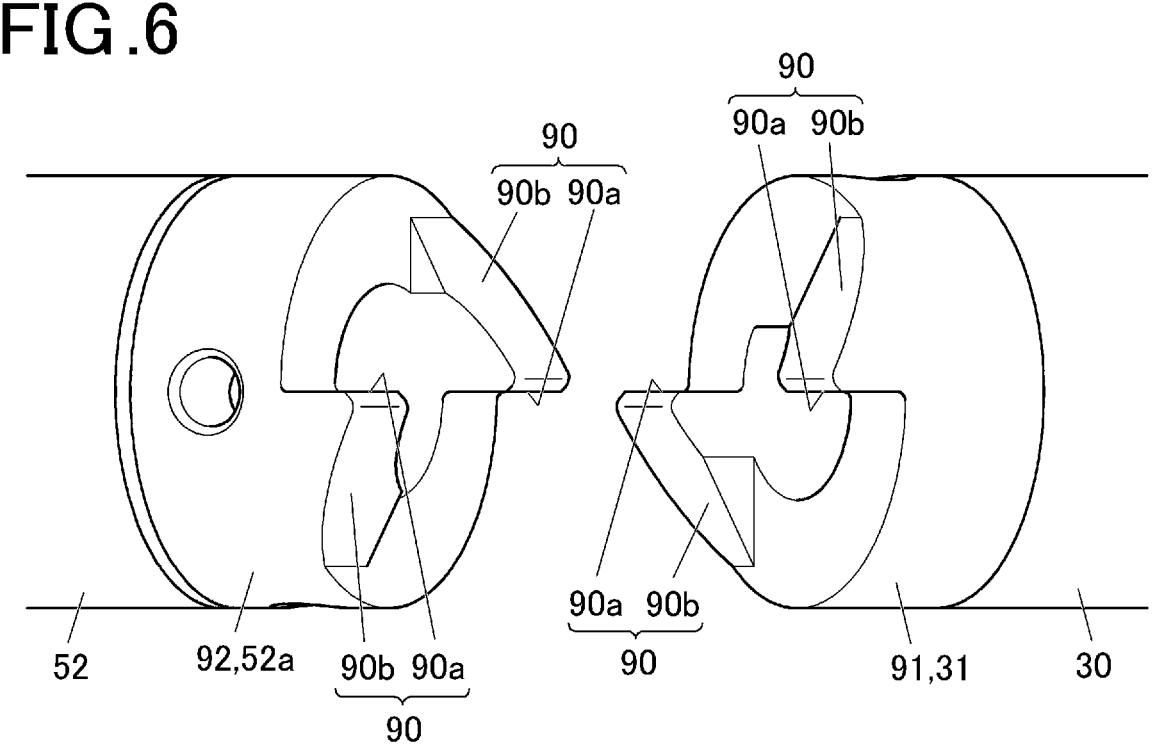
FIG. 6 is a perspective view of a clutch member on a flexible shaft side and a clutch member on a spool shaft side.

The clutch member 92 disposed on the end 52a of the flexible shaft 52 and the clutch member 91 disposed on the one end 31 of the spool shaft 30 have the same shape as shown, for example, in FIG. 6.

The clutch member 92 on the flexible shaft 52 rotates together with the end 52a of the flexible shaft 52.

The clutch member 91 on the spool shaft 30 is fixed to the spool shaft 30, and rotates together with the spool shaft 30.

Figure 5A:
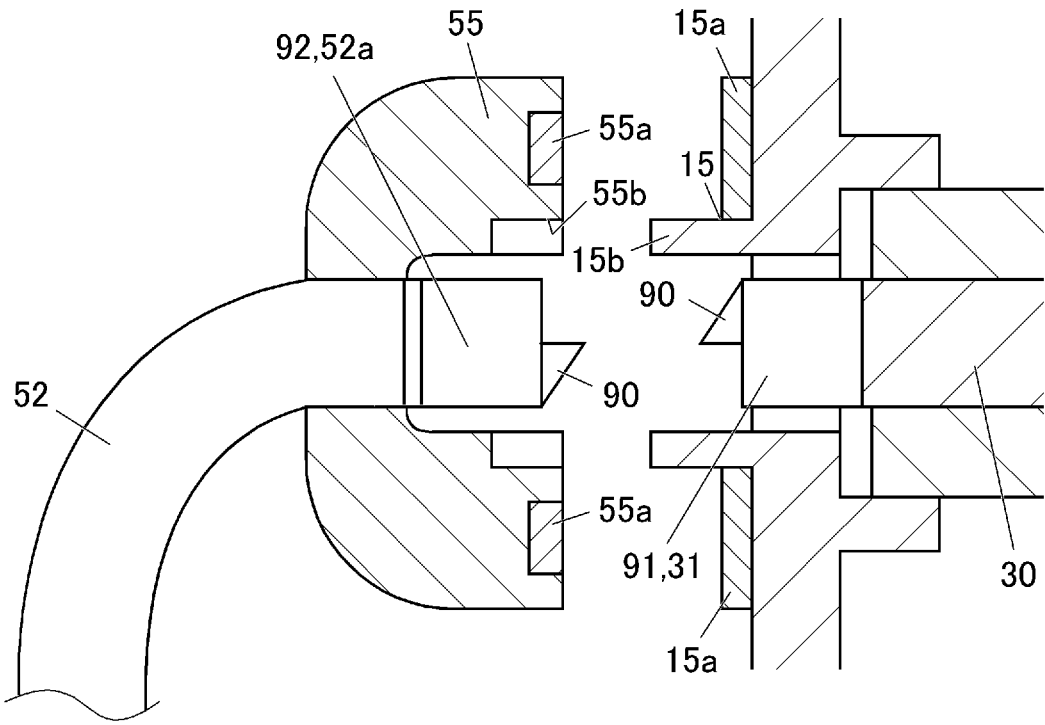
FIG. 5A is an enlarged view of a coupling part and a coupling counterpart of the fishing reel of the embodiment, showing a state in which the coupling part and the coupling counterpart are decoupled from one another.
Figure 5B:
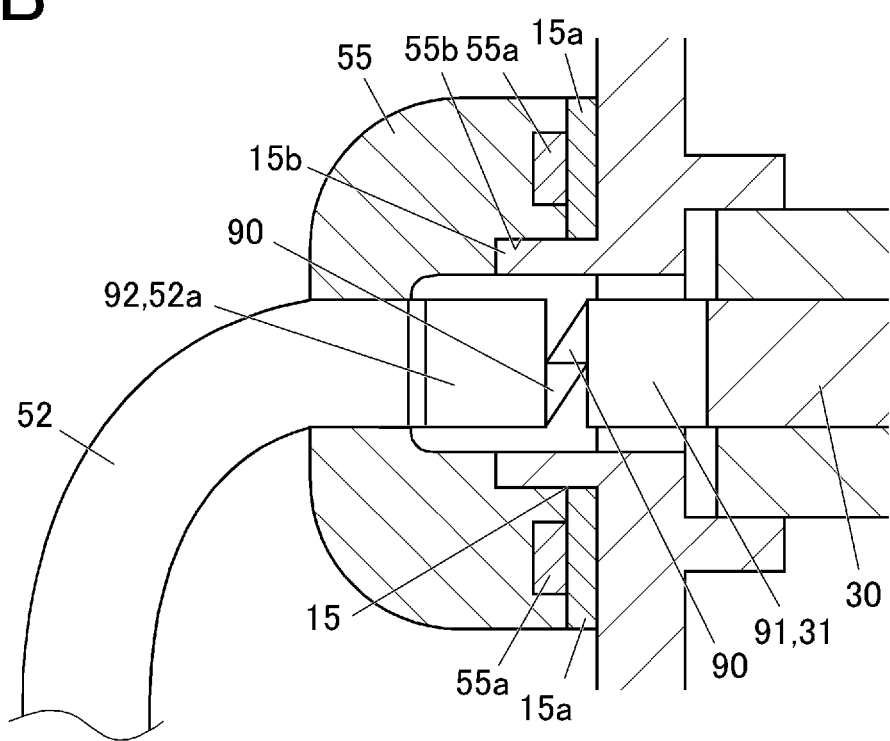
FIG. 5B is an enlarged view of the coupling part and the coupling counterpart of the fishing reel of the embodiment, showing a state in which the coupling part and the coupling counterpart are coupled with one another.

As shown in FIG. 1B and FIG. 5B, the clutch member 91 on the one end 31 of the spool shaft 30 and the clutch member 92 on the end 52a of the flexible shaft 52 are engaged with one another in the state in which the coupling part 55 is coupled with the coupling counterpart 15, thus transmitting the driving force of the motor power unit 50 to the spool shaft 30, the driving force being turning force of the flexible shaft 52.

On each of the clutch members 91, 92 of this embodiment, two claws 90 are formed.

Each claw 90 has, for example, as shown in FIG. 6, a vertical surface 90a substantially perpendicular to the rotational direction of the clutch member 91/92 and an inclined surface 90b descending from the tip side of the vertical surface 90a to the base side of the clutch member 91/92. For example, the vertical surface 90a and the inclined surface 90b of each claw 90 are in contact with one another, forming an angle of approximately 45 degrees.

The claws 90 of the clutch member 92 on the flexible shaft 52 and the claws 90 of the clutch member 91 on the spool shaft 30 are engaged with one another such that their vertical surfaces 90a face one another, thus transmitting the turning force of the flexible shaft 52 to the spool shaft 30.

The number of claws 90 on each of the clutch members 91, 92 is arbitrary as far as it is two or more, but preferably around two to four.

As the number of claws 90 provided on each of the clutch members 91, 92 is small, the size of each claw 90 can be large, which makes it possible to strongly transmit the turning force of the clutch member 92 to the clutch member 91.

If only one claw 90 is provided and this claw 90 is damaged, the turning force cannot be transmitted, and hence one claw 90 is not preferable. If two or more claws 90 are provided, and, for example, one claw 90 is damaged, the turning force can be transmitted by the other claw(s) 90, and hence temporary use is possible until the clutch member 91/92 is replaced with another.

Since the claws 90 of the clutch members 91, 92 have the inclined surfaces 90b, the clutch member 91 on the spool shaft 30 and the clutch member 92 on the flexible shaft 52 can be engaged with one another easily.

For example, even if the claws 90 of the clutch member 91 and the claws 90 of the clutch member 92 are at positions not corresponding to one another when the coupling part 55 is to be coupled with the coupling counterpart 15, the claws 90 of the clutch members 91, 92 can be engaged with one another by butting the tips of the claws 90 of one clutch member 91 (92) against the inclined surfaces 90b of the claws 90 of the other clutch member 92 (91) and making the clutch members 91, 92 close to one another following the inclined surfaces 90b.

In particular, according to the clutch members 91, 92 provided with such claws 90, in a state in which the clutch member 92 on the flexible shaft 52 is being rotated, the clutch member 92 can be engaged with the clutch member 91 on the spool shaft 30 by coupling the coupling part 55 and the coupling counterpart 15 with one another.

For example, if the clutch member 92 on the flexible shaft 52 is rotating when the coupling part 55 is to be coupled with the coupling counterpart 15, as the tips of the claws 90 of the clutch member 92 on the flexible shaft 52 butt the inclined surfaces 90b of the claws 90 of the clutch member 91 on the spool shaft 30, the clutch member 92 comes closer to the clutch member 91 following the inclined surfaces 90b, so that the clutch members 91, 92 can be engaged with one another such that the vertical surfaces 90a of the claws 90 of the clutch members 91, 92 face one another, and at the same time as the engagement, the spool shaft 30 can be rotated.

Considering that in the state in which the clutch member 92 on the flexible shaft 52 is being rotated, the clutch member 92 is engaged with the clutch member 91 on the spool shaft 30, the number of claws 90 is, after all, preferably around two to four.

If the number of claws 90 is large, the claws 90 are disposed at narrow intervals on each of the clutch members 91, 92, which makes it difficult to engage the clutch member 92 that is rotating and the clutch member 91 that is not rotating with one another regardless of their claws 90 having the inclined surfaces 90b, because the claws 90 of the rotating clutch member 92 and the claws 90 of the not-rotating clutch member 91 are likely to repel one another.

The coupling part 55 and the coupling counterpart 15 are coupled with one another by the magnetic force of the magnets 55a, and can be promptly decoupled from one another. Hence, even while the clutch member 92 on the flexible shaft 52 is rotating, the motor power unit 50 can be separated from the reel body 10 by detaching the coupling part 55 from the coupling counterpart 15 and disengaging the clutch member 92 on the flexible shaft 52 from the clutch member 91 on the spool shaft 30.

In order to use the fishing reel 100 thus configured as a manual reel, as shown in FIG. 1A and FIG. 5A, the motor power unit 50 is separated from the spool shaft 30 by decoupling the coupling part 55 from the coupling counterpart 15.

When the handle 40 of the fishing reel 100 is rotated in a predetermined direction, the turning force is transmitted to the first handle shaft 41, the first gear 41a, the second gear 42a, the second handle shaft 42, the first rotation transmission mechanism 60 and the spool 20 (ring gear 21a) in this order, which can rotate the spool 20.

Thus, the driving force due to the handle 40 of the fishing reel 100 being rotated is transmitted to the spool 20, which can rotate the spool 20 and wind the fishing line around the spool 20.

In order to use the fishing reel 100 as an electric reel, as shown in FIG. 1B and FIG. 5B, the motor power unit 50 is connected to the spool shaft 30 by coupling the coupling part 55 with the coupling counterpart 15 such that the clutch member 92 on the flexible shaft 52 is engaged with the clutch member 91 on the spool shaft 30.

When the controller 53 is operated to run the motor 51 of the motor power unit 50, the turning force of the motor 51 is transmitted to the flexible shaft 52, the spool shaft 30, the second rotation transmission mechanism 70 and the spool 20 (ring gear 21a) in this order, which can rotate the spool 20.

Thus, the driving force due to the motor power unit 50 (motor 51) of the fishing reel 100 being run is transmitted to the spool 20, which can rotate the spool 20 and wind the fishing line around the spool 20.

In particular, since the fishing reel 100 of this embodiment includes the controller(s) 53 that can control the motor power unit 50 (motor 51) remotely, and the controller 53 is set at a position desired by the user so as to be usable, the controller 53 can be used with excellent operability, and the fishing reel 100 can be used appropriately.

Further, since various types of controllers 53 are usable as the controller(s) 53 of the fishing reel 100, the fishing reel 100 can be customized for the user by selecting one or more controllers 53 according to his/her preference, and the fishing reel 100 can be used appropriately.

In the case where the fishing reel 100 is used as an electric reel, the position where the motor 51 is set is arbitrary. The motor 51 may be put in a user's waist bag or placed at user's feet.

Thus, the fishing reel 100 of this embodiment can be used as both a manual reel and an electric reel.

In particular, since, in the fishing reel 100 of this embodiment, the coupling part 55 and the coupling counterpart 15 can be coupled with one another by the magnetic force of the magnets 55a, the fishing reel 100 can easily switch the coupling part 55 and the coupling counterpart 15 being coupled and being decoupled.

Prompt switching can be performed between use as a manual reel for which the coupling part 55 and the coupling counterpart 15 are decoupled from one another, and accordingly the clutch member 92 on the flexible shaft 52 and the clutch member 91 on the spool shaft 30 are disengaged from one another, and use as an electric reel for which the coupling part 55 and the coupling counterpart 15 are coupled with one another, and accordingly the clutch member 92 on the flexible shaft 52 and the clutch member 91 on the spool shaft 30 are engaged with one another.

Further, since, as described above, the coupling part 55 and the coupling counterpart 15 can be coupled with and decoupled from one another even while the motor power unit 50 is running and the clutch member 92 on the flexible shaft 52 is rotating, the fishing reel 100 of this embodiment can more promptly switch between the use mode as a manual reel and the use mode as an electric reel.

In the above embodiment, the magnets 55a are disposed on the coupling part 55 and the ferromagnetic material 15a is disposed on the coupling counterpart 15 so that the coupling part 55 and the coupling counterpart 15 can be attached (coupled) to one another, but these are not limitations. For example, magnets may be disposed on both the coupling part 55 and the coupling counterpart 15 so that the coupling part 55 and the coupling counterpart 15 can be attached (coupled) to one another.

Alternatively, a ferromagnetic material(s) may be disposed on the coupling part 55 and a magnet(s) may be disposed on the coupling counterpart 15 so that the coupling part 55 and the coupling counterpart 15 can be attached (coupled) to one another.

Further, in the above embodiment, the coupling part 55 is provided with the annular recess 55b, and the coupling counterpart 15 is provided with the tubular projection 15b, but the present disclosure is not limited thereto. For example, the coupling part 55 may be provided with a tubular projection (insertion-engagement projection), and the coupling counterpart 15 may be provided with an annular recess (insertion-engagement recess).

Figure 7:
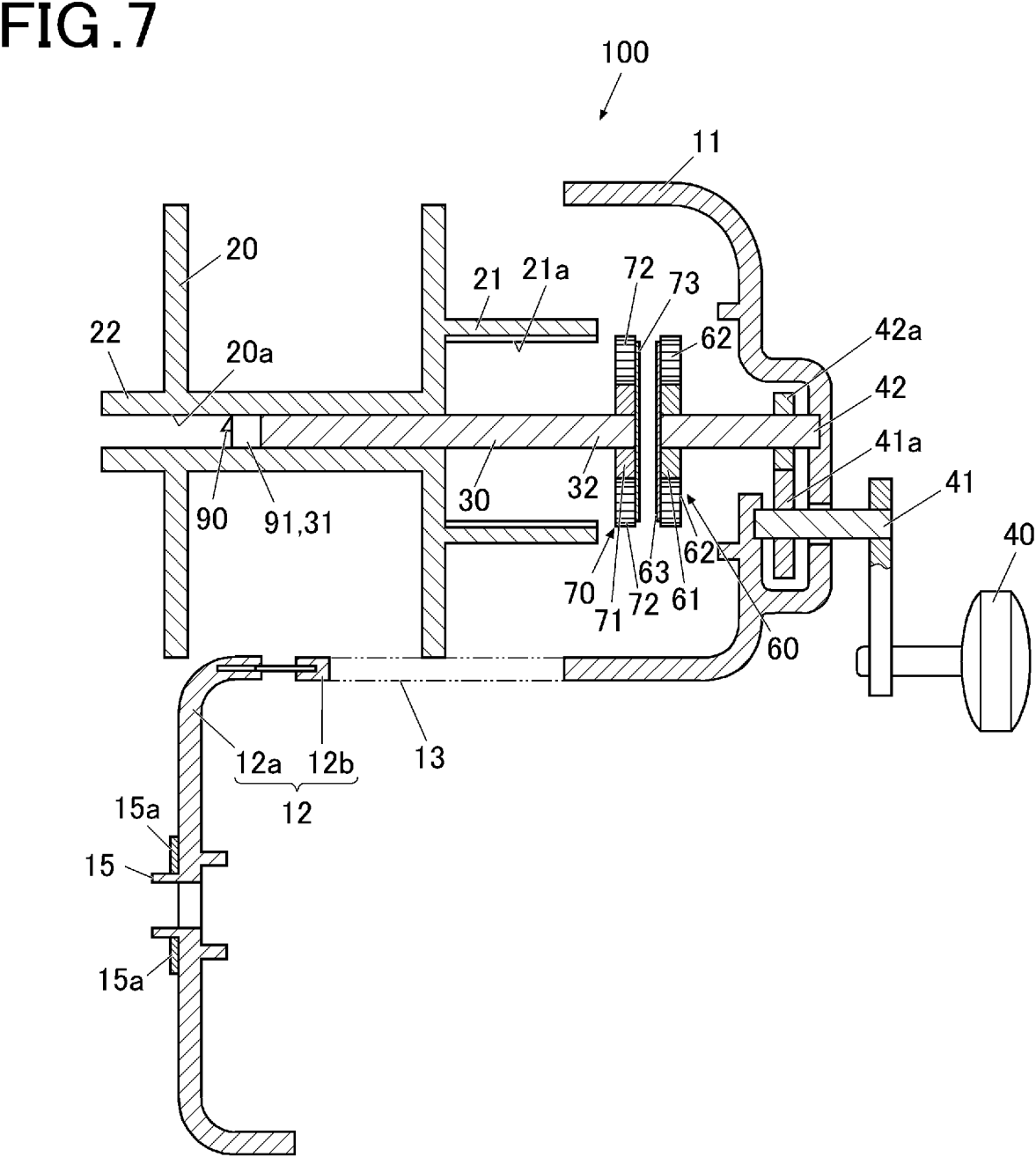
FIG. 7 is a sectional view of the fishing reel, showing a state in which a spool is detached from the fishing reel to be replaced.

In the fishing reel 100 of the embodiment, as shown in FIG. 7, the spool 20 can be detached from the reel body 10, so that the fishing line can be replaced together with the spool 20.

For example, as shown in FIG. 7, the spool 20 can be detached from the spool shaft 30 or the reel body 10 in a state in which at least part of the second body 12 is detached from the fishing reel 100, for example, by moving a movable part 12a of the second body 12 away from a fixed part 12b thereof.

Since the motor 51 (motor power unit 50) of the fishing reel 100 is detachably disposed outside the reel body 10, and the handle 40, the first rotation transmission mechanism 60 and the second rotation transmission mechanism 70 are gathered on the first body 11 side of the reel body 10, the spool 20 can be detached from the second body 12 side of the reel body 10 by being pulled and removed from the one end 31 side of the spool shaft 30.

The spool shaft 30, the second rotation transmission mechanism 70 and the first rotation transmission mechanism 60 are supported on the first body 11 side by a not-shown support, so that they do not come off when the spool 20 is detached.

In the embodiment, the movable part 12a of the second body 12 is moved away from the fixed part 12b to form an opening for pulling and removing the spool 20 from the spool shaft 30, but the second body 12 may be detached from the third body 13 to form the opening for pulling and removing the spool 20 from the spool shaft 30.

Thus, according to the fishing reel 100 having the spool 20 detachable from the reel body 10, preparation of a plurality of spools 20 around which various fishing lines are wound makes it possible to promptly replace the fishing line together with the spool 20 so that types of fishing can be changed and various water depths (e.g., water depths of 100 m to 2,000 m) or various fishes can be handled.

As described above, in the case of the conventional electric reel, the motor or the like built in the reel body prevents the spool from being detached, so that the fishing line cannot be replaced together with the spool, whereas in the case of the fishing reel 100 of the embodiment, the motor 51 is detachably disposed outside the reel body 10, and the first rotation transmission mechanism 60 and the second rotation transmission mechanism 70 are gathered on the one end side 21 of the spool 20, so that the fishing reel 100 usable as an electric reel makes it possible to replace the fishing line together with the spool 20.

Thus, the fishing reel 100 of the embodiment can be appropriately used as both a manual reel and an electric reel.

In particular, arrangement of the motor 51 (motor power unit 50) outside the reel body 10 makes it possible to replace the fishing line together with the spool 20.

Also, arrangement of the motor 51 (motor power unit 50) outside the reel body 10 makes it possible to reduce the weight of the reel (reel body 10) of the fishing reel 100 and improve operability of the reel.

In the case of the conventional electric reel, in which the motor is built in the reel body, heat generated by the motor stays inside and sometimes causes burnout, whereas in the case of the fishing reel 100 of this embodiment, the motor 51 (motor power unit 50) as an external motor can easily release heat generated thereby, so that occurrence of problems, such as burnout, can be reduced.

Further, in the case of the conventional electric reel, in which the motor is built in the reel body, the size of the motor may be limited according to the size of the reel body, whereas in the case of the fishing reel 100 of this embodiment, the size of the motor 51 as an external motor is not limited according to the size of the reel body 100, so that any motor 51 is likely to be used. For example, the motor 51 of any size or any performance can be used.

As disclosed in JP H03-187330 A, the technique of attaching a motor to a manual reel to make it usable as an electric reel too is known. In the case of the fishing reel adopting this conventional technique, the handle needs to be detached in order to attach the motor. Thus, switching between use as a manual reel and use as an electric reel is troublesome.

The present inventor therefore has studied eagerly and developed the fishing reel 100 that can perform the above-mentioned switching easily and can wind a fishing line as both a manual reel and an electric reel.

More specifically, the fishing reel 100 produced can easily switch the coupling part 55 on the flexible shaft 52 of the motor power unit 50 and the coupling counterpart 15 of the reel body 10 being coupled with one another and being decoupled from one another, and can be appropriately used as both an electric reel and a manual reel.

The present disclosure is not limited to the above embodiment.

For example, as shown in FIG. 8A, FIG. 8B, FIG. 9A and FIG. 9B, a lock mechanism 80 that maintains the state in which the coupling part 55 and the coupling counterpart 15 are coupled with one another may be provided.

The lock mechanism 80 is for switching states that are a locked state in which reinforcement is performed to maintain the coupling of the coupling part 55 and the coupling counterpart 15 by the magnetic force of the magnets 55a and an unlocked state in which the coupling part 55 and the coupling counterpart 15 are coupled by the magnetic force thereof only.

Figure 8A:
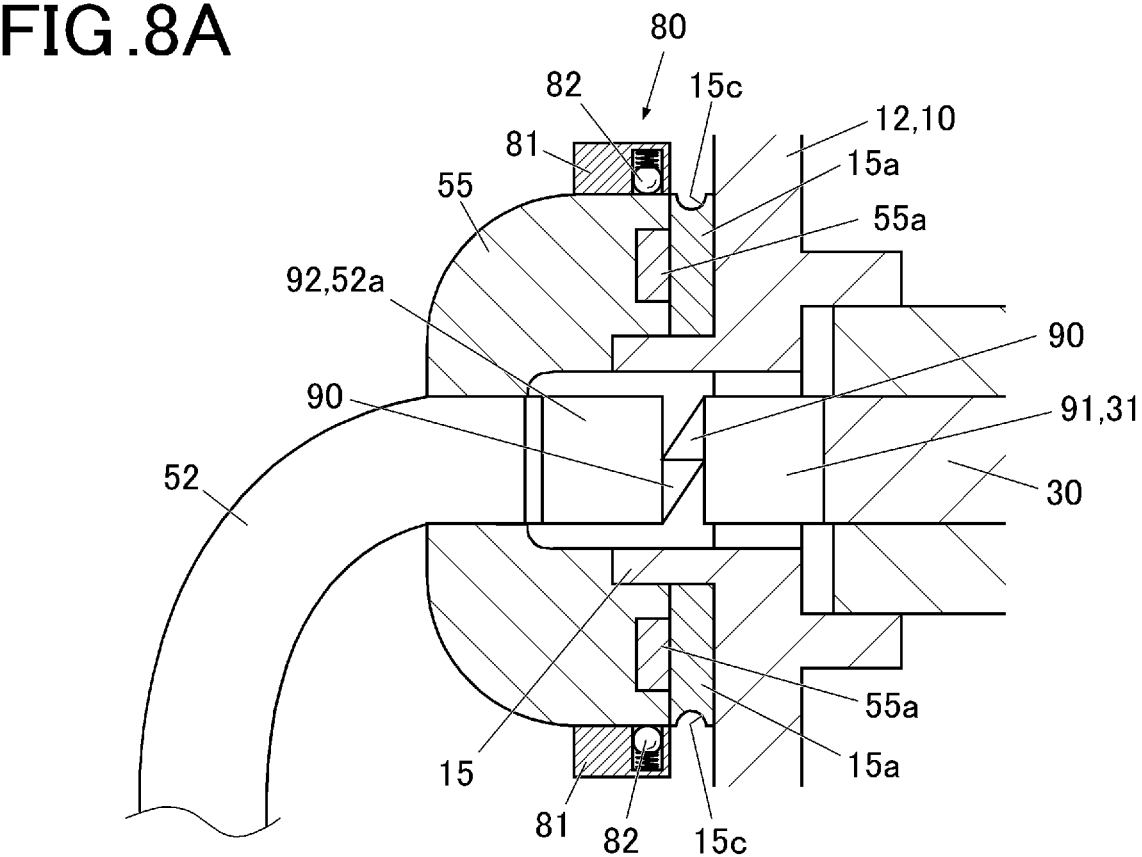
FIG. 8A is an illustration to explain a lock mechanism of the fishing reel of the embodiment, showing an unlocked state.
Figure 8B:
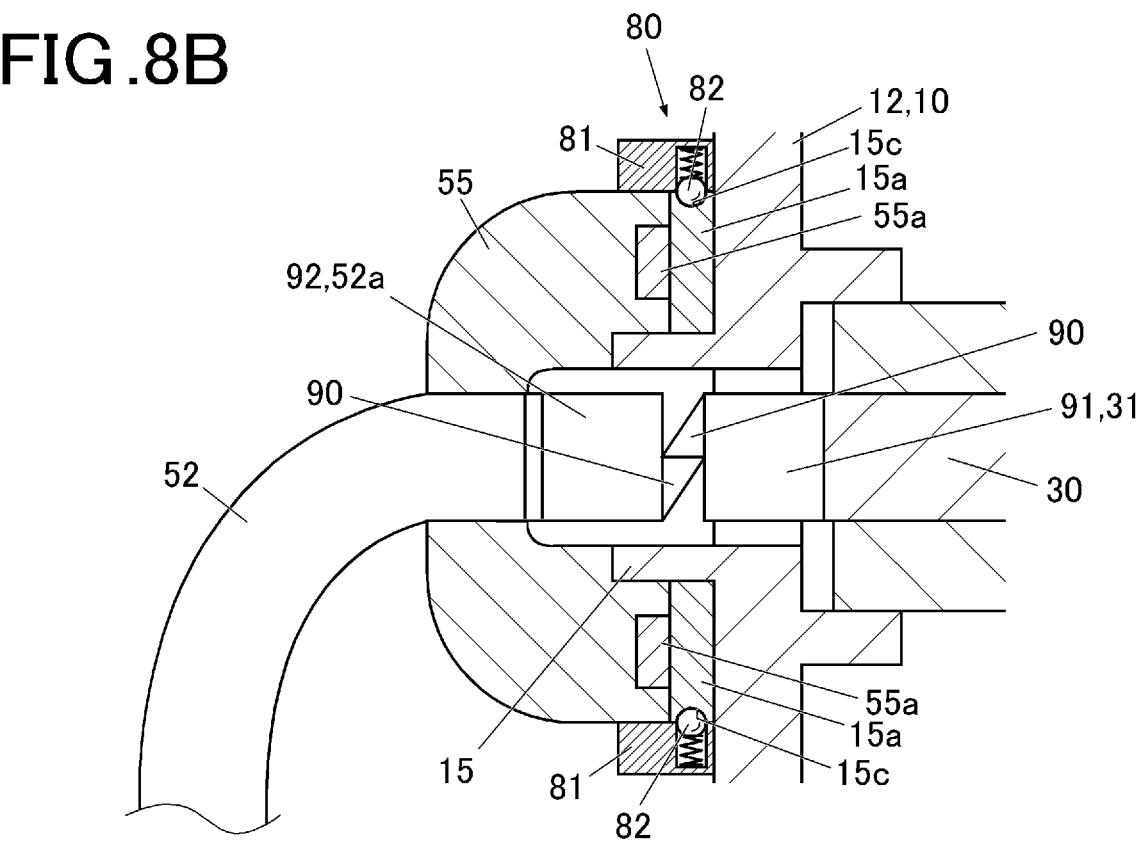
FIG. 8B is an illustration to explain the lock mechanism of the fishing reel of the embodiment, showing a locked state.

The lock mechanism 80 shown in FIG. 8A and FIG. 8B includes a lock 81 attached to the coupling part 55 so as to be slidable and a recess 15c formed in the coupling counterpart 15 (ferromagnetic material 15a in this example).

The lock 81 is a component disposed so as to be contactable with and separable from the coupling counterpart 15 (ferromagnetic material 15a) in the state in which the coupling part 55 and the coupling counterpart 15 are coupled with one another. This lock 81 has a lock claw 82 disposed so as to be movable back and forth with a spring or the like.

As shown in FIG. 8A, a state in which the lock 81 is disposed away from the coupling counterpart 15 (ferromagnetic material 15a) is the unlocked state, in which the coupling part 55 and the coupling counterpart 15 are coupled by the magnetic force of the magnets 55a only.

As shown in FIG. 8B, a state in which the lock 81 is disposed near/on the coupling counterpart 15 (ferromagnetic material 15a) and the lock claw 82 is inserted in and engaged with the recess 15c of the ferromagnetic material 15a is the locked state, in which reinforcement is performed to maintain the coupling of the coupling part 55 and the coupling counterpart 15.

Switching the states, which are the unlocked state and the locked state, by sliding the lock 81 of the lock mechanism 80 can be performed with a single touch.

The lock mechanism 80 shown in FIG. 8A and FIG. 8B, is, for example, an application of a quick disconnect device used for connecting a gas valve and a gas appliance or an application of a hose joint used for connecting a water supply and a hose.

In the unlocked state shown in FIG. 8A, the coupling part 55 and the coupling counterpart 15 can be easily decoupled from one another.

For example, in order that the fishing reel 100 being used as an electric reel can be easily switched to a manual reel, the lock mechanism 80 is set to the unlocked state.

In the locked state shown in FIG. 8B, the coupling part 55 and the coupling counterpart 15 are hardly decoupled from one another and their coupling can be maintained.

For example, in order that the coupling part 55 is hardly decoupled from the coupling counterpart 15 as the fishing reel 100 is continuously used as an electric reel, the locking mechanism 80 is set to the locked state.

Figure 9A:
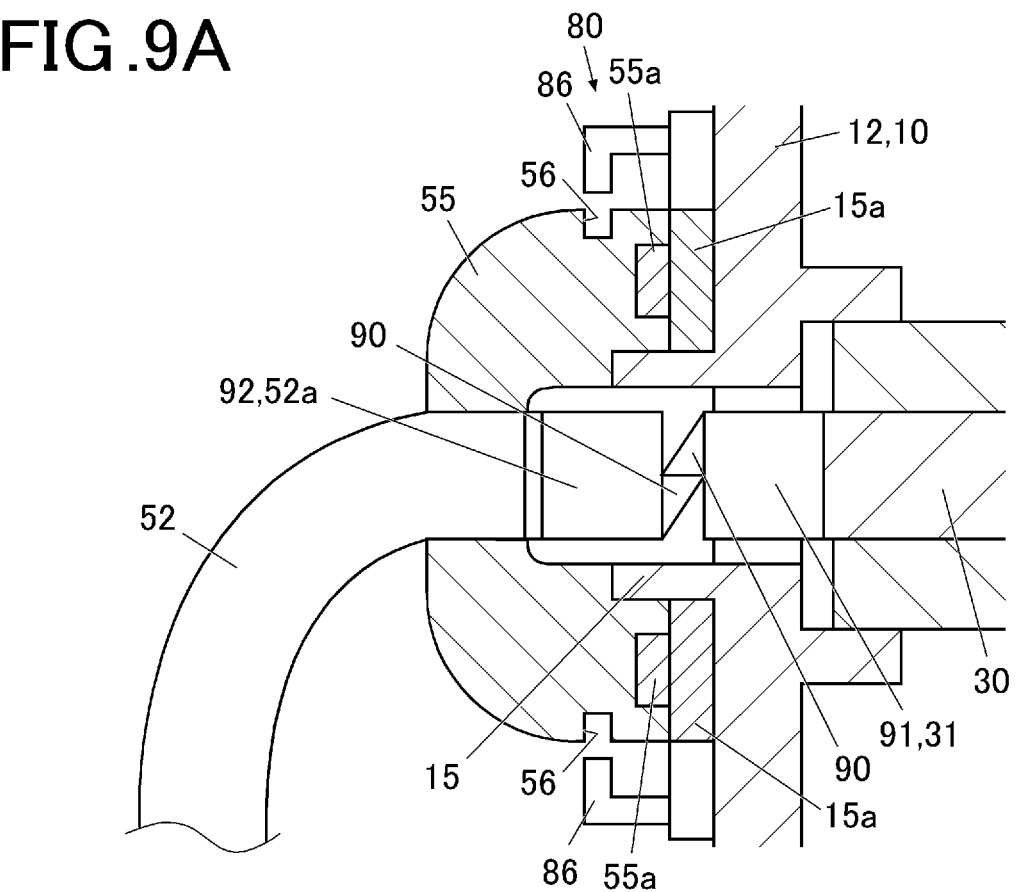
FIG. 9A is an illustration to explain a lock mechanism of the fishing reel of the embodiment, showing an unlocked state.
Figure 9B:
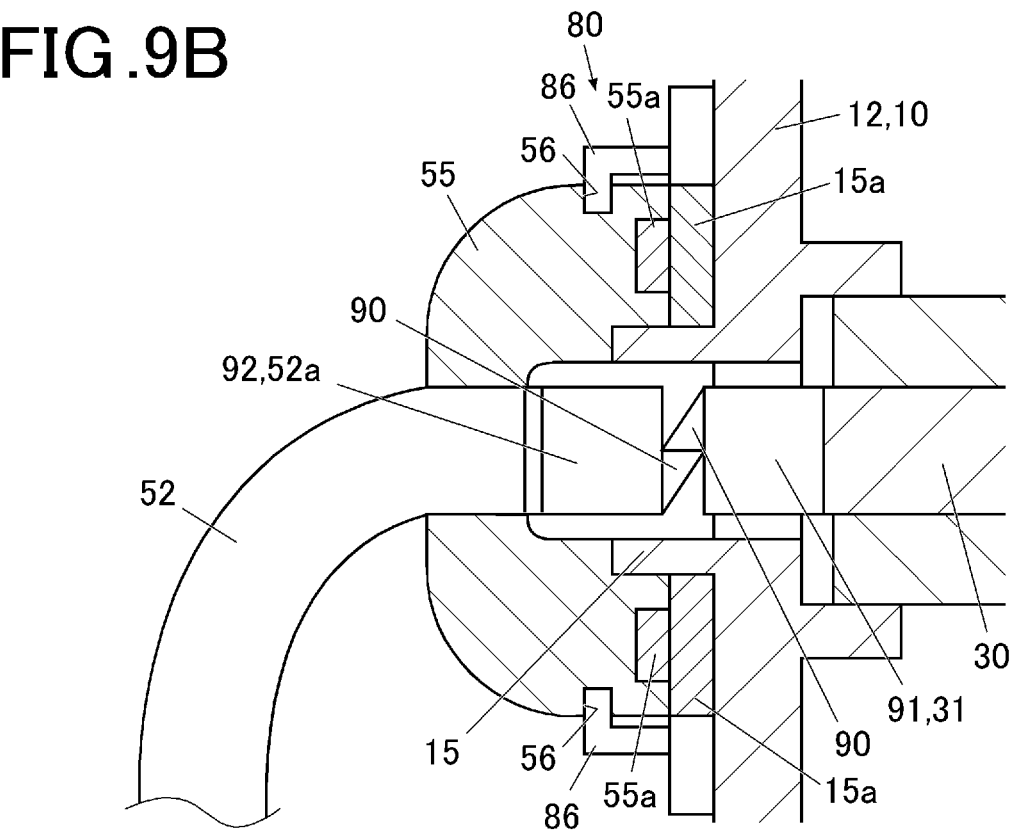
FIG. 9B is an illustration to explain the lock mechanism of the fishing reel of the embodiment, showing a locked state.

The lock mechanism 80 shown in FIG. 9A and FIG. 9B includes a lock 86 attached to the reel body 10 (second body 12) so as to be slidable and a recess 56 formed in the coupling part 55.

The lock 86 is a component disposed so as to be contactable with and separable from the coupling part 55 in the state in which the coupling part 55 and the coupling counterpart 15 are coupled with one another.

As shown in FIG. 9A, a state in which the lock 86 is disposed away from the coupling part 55 is the unlocked state, in which the coupling part 55 and the coupling counterpart 15 are coupled by the magnetic force of the magnets 55a only.

As shown in FIG. 9B, a state in which the lock 86 is disposed near/on the coupling part 55 and the tip of the lock 86 is inserted in and engaged with the recess 56 of the coupling part 55 is the locked state, in which reinforcement is performed to maintain the coupling of the coupling part 55 and the coupling counterpart 15.

Switching the states, which are the unlocked state and the locked state, by sliding the lock 86 of the lock mechanism 80 can be performed with a single touch.

The lock mechanism 80 shown in FIG. 9A and FIG. 9B, is, for example, an application of an appliance (tablet holder)

for setting a smartphone on a dashboard of an automobile or on a handle of a motorcycle or a bicycle or an application of a ratchet clamp.

In the unlocked state shown in FIG. 9A, the coupling part 55 and the coupling counterpart 15 can be easily decoupled from one another.

For example, in order that the fishing reel 100 being used as an electric reel can be easily switched to a manual reel, the lock mechanism 80 is set to the unlocked state.

In the locked state shown in FIG. 9B, the coupling part 55 and the coupling counterpart 15 are hardly decoupled from one another and their coupling can be maintained.

For example, in order that the coupling part 55 is hardly decoupled from the coupling counterpart 15 as the fishing reel 100 is continuously used as an electric reel, the locking mechanism 80 is set to the locked state.

The fishing reel 100 having such a lock mechanism 80 can be used for desired types of fishing by being used in different modes, which are the mode in which the coupling part 55 and the coupling counterpart 15 can be easily decoupled from one another and the mode in which the coupling part 55 and the coupling counterpart 15 are hardly decoupled from one another.

The lock mechanism 80 of the fishing reel 100 is not limited to the above embodiment, and various clasps or the like, such as a toggle latch, are applicable thereto.

The present disclosure is not limited to the above embodiment.

Figure 10A:
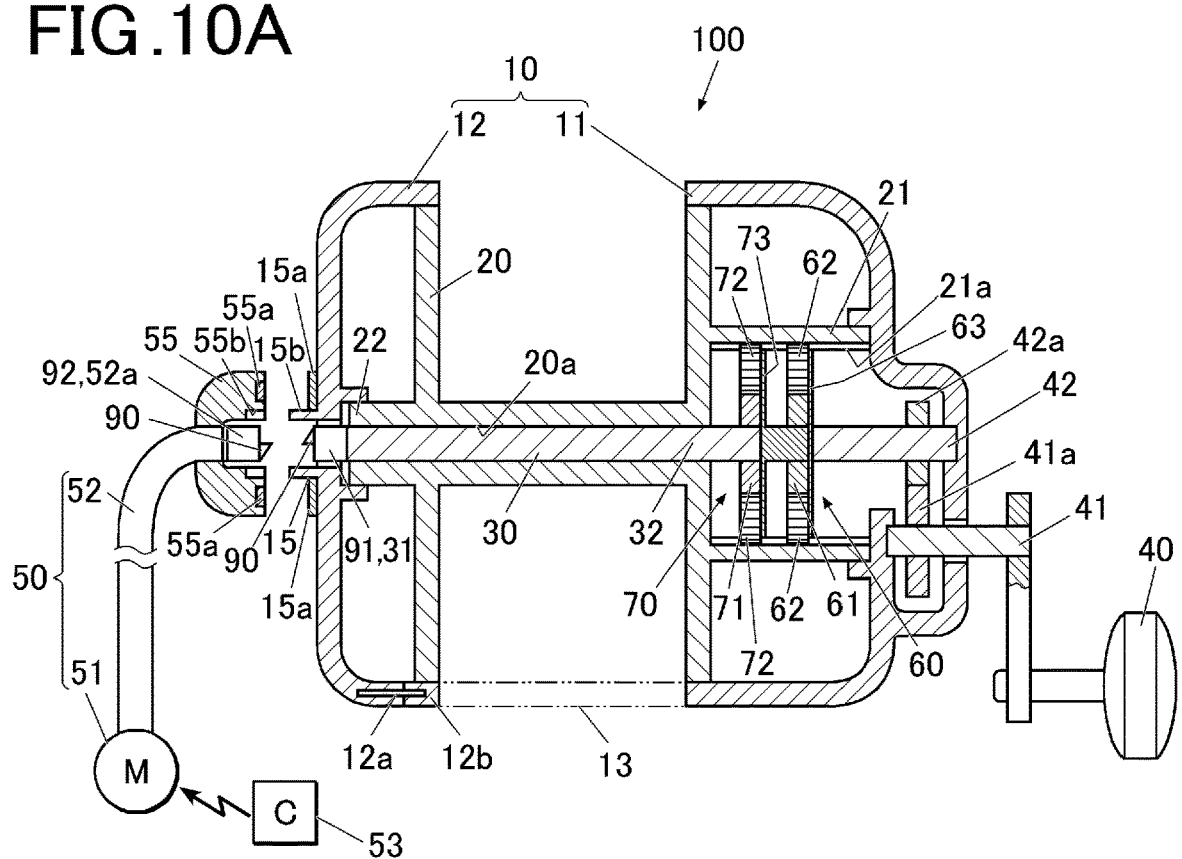
FIG. 10A is a sectional view of a modification of the fishing reel, showing the mode as a manual reel.
Figure 10B:
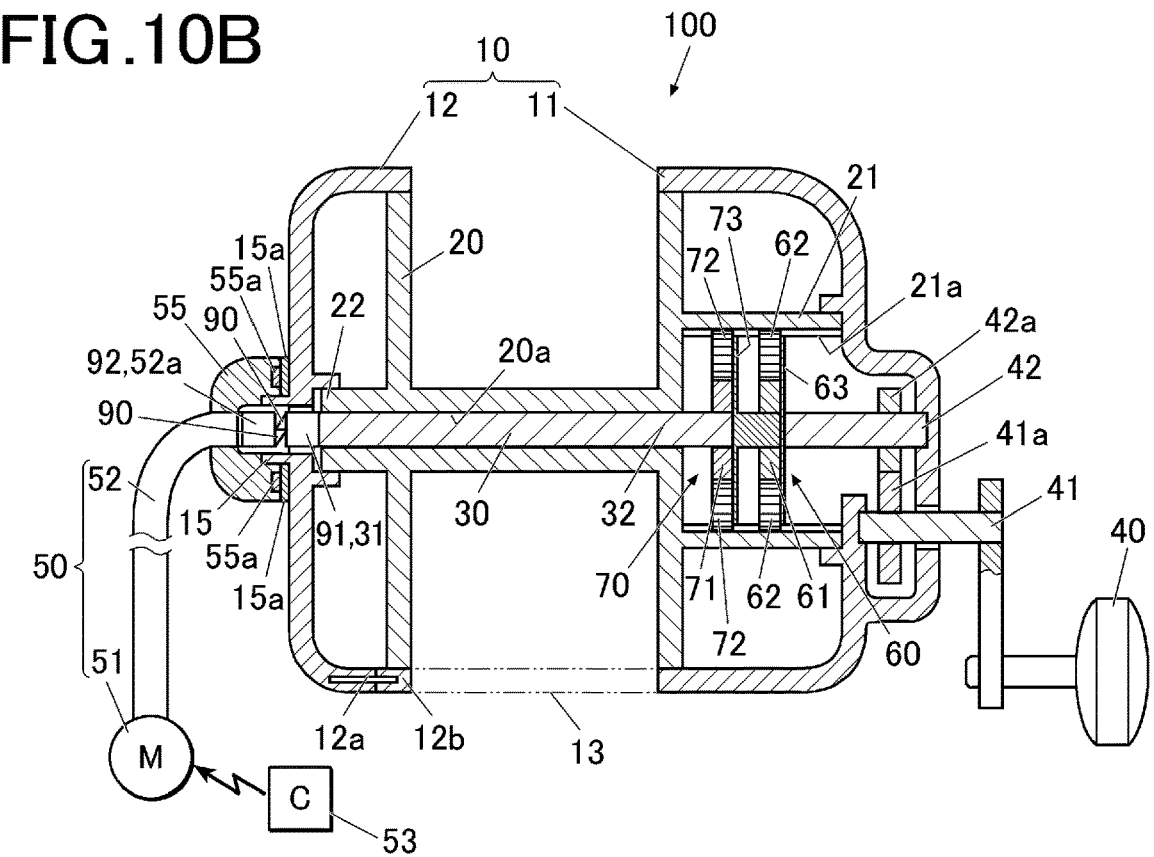
FIG. 10B is a sectional view of the modification of the fishing reel, showing the mode as an electric reel.

For example, as shown in FIG. 10A and FIG. 10B, the first rotation transmission mechanism 60 may be a solar-type planetary gear mechanism.

The first rotation transmission mechanism 60 that is a solar-type planetary gear mechanism includes a planetary carrier 63 fixed to an end of the second handle shaft 42, a plurality of planetary gears 62 supported by the planetary carrier 63, and a sun gear 61. The sun gear 61 is attached to a shaft extending from a planetary carrier 73 of the second rotation transmission mechanism 70.

Thus, in this fishing reel 100, the first rotation transmission mechanism 60 and the second rotation transmission mechanism 70 are coupled with one another.

The fishing reel 100 thus configured too can be appropriately used as both a manual reel and an electric reel.

Figure 11:
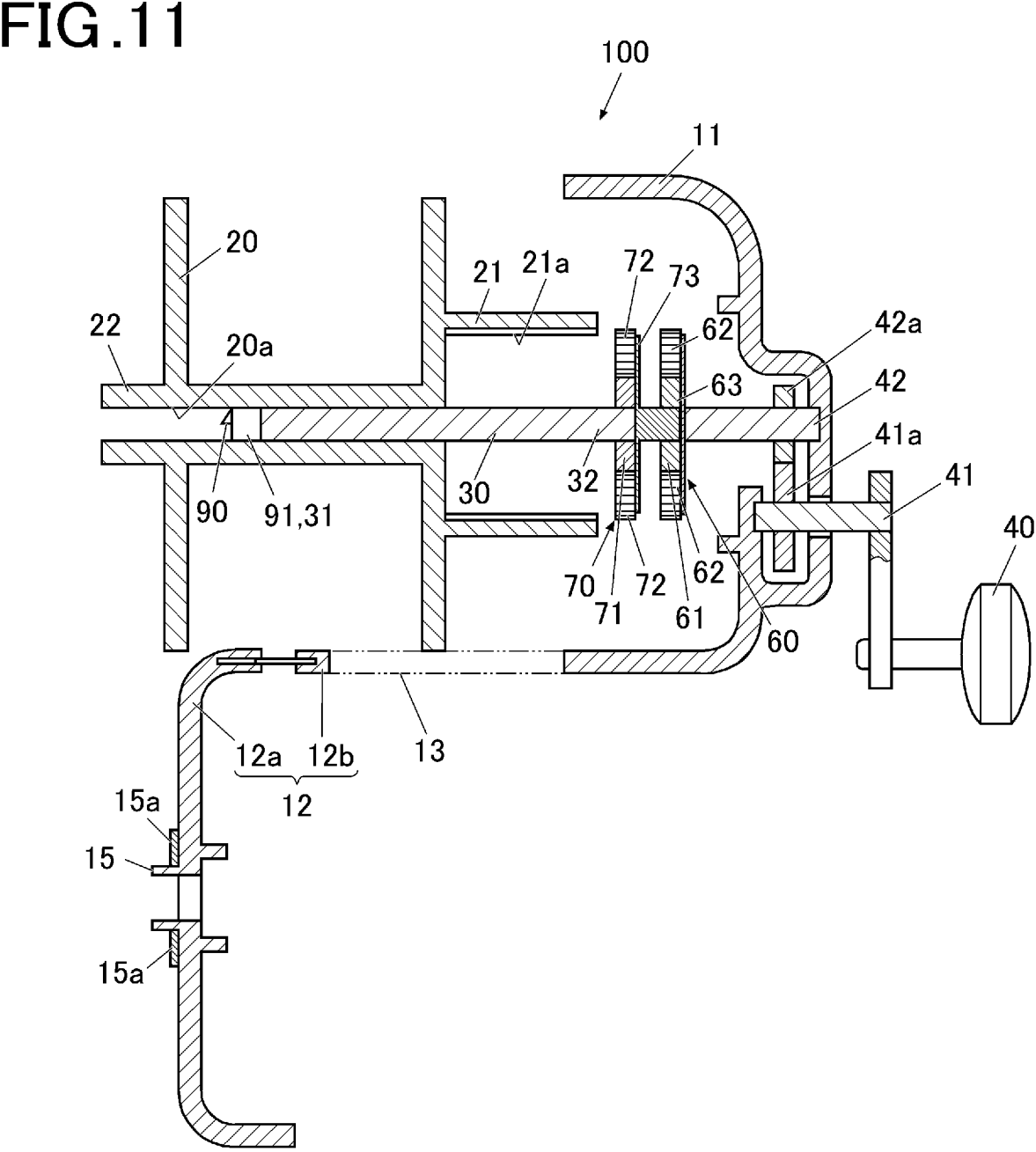
FIG. 11 is a sectional view (of the modification) of the fishing reel, showing the state in which the spool is detached from the fishing reel to be replaced.

In the fishing reel 100 thus configured too, as shown in FIG. 11, the spool 20 can be detached from the reel body 10, so that the fishing line can be replaced together with the spool 20. In this fishing reel 100 too, the spool shaft 30, the second rotation transmission mechanism 70 and the first rotation transmission mechanism 60 are supported on the first body 11 side by a not-shown support, so that they do not come off when the spool 20 is detached.

In the above embodiment, the fishing reel 100 is used as a manual reel and as an electric reel, but the present disclosure is not limited thereto. For example, if the fishing reel 100 is used as a manual reel in a state in which the motor power unit 50 is connected to the spool shaft 30, the fishing reel 100 may be used as a fishing reel with an electric assist function that utilizes the driving force of the motor 51 (motor power unit 50) as auxiliary force when the user turns the handle 40.

Further, although not described in detail in the above embodiment, the fishing reel 100 has a drag function, and while the fishing line is being wound up as a manual reel and also while the fishing line is being wound up as an electric reel, the spool 20 rotates in the reverse direction in sync with tugs of a fish so that the fishing line is not cut.

Further, in the above embodiment, in the fishing reel 100, the motor power unit 50 (motor 51) is disposed outside the reel body 10, but the present disclosure is limited thereto. The fishing reel 100 may be a fishing reel (not shown) in which the motor 51 is built in the reel body 10 and can be controlled remotely by the controller 53. In this case, the reel body 10 is provided with a wireless communication module.

In the case of such a fishing reel 100 too, the controller 53 can be set at a position desired by its user so as to be usable, so that the controller 53 can be used with excellent operability, and the fishing reel 100 can be used appropriately.

Further, in the above embodiment, the fastened-by-bolt setting component 535a is used for attaching and setting the controller 53 to and on a rod, but may be used for attaching and setting the controller 53 to and on any long component (e.g., a bar-like component that constitutes a handrail or a fence).

Similarly, the band-shaped setting component 535b may be used for attaching and setting the controller 53 to and on any component.

Further, in the above embodiment, the first rotation transmission mechanism 60 and the second rotation transmission mechanism 70 are both star-type planetary gear mechanisms, or respectively a solar-type planetary gear mechanism and a star-type planetary gear mechanism, but the present disclosure is not limited thereto. The rotation transmission mechanisms (60, 70) may be another type of planetary gear mechanism. For example, the first rotation transmission mechanism 60 and the second rotation transmission mechanism 70 may be an integrated planetary gear mechanism (i.e., the first rotation transmission mechanism 60 and the second rotation transmission mechanism 70 being a single planetary gear mechanism).

Further, the first rotation transmission mechanism 60 and the second rotation transmission mechanism 70 are not even limited to planetary gear mechanisms, but may be other gear mechanisms or other power transmission mechanisms.

Further, in the above embodiment, the fishing reel 100, which is a bait casting reel (double bearing reel), can switch between and be used as a manual reel, in which the spool 20 is rotated by the handle 40, and an electric reel, in which the spool 20 is rotated by the motor power unit 50, but the present disclosure may be applied, for example, to a technique of a fishing reel that can switch between and be used as a manual reel in which the bail arm of the spinning reel is rotated by the handle and an electric reel in which the bail arm is rotated by the motor power unit 50.

It goes without saying that the others, such as specific detailed structure, can also be changed as appropriate.

Although one or more embodiments of the present disclosure have been described above, the scope of the present disclosure is not limited to the above-described embodiments, and includes the scope of the present disclosure described in claims and equivalents thereof.

The invention claimed is:

1. A fishing reel comprising:
a reel body;
a spool supported by the reel body so as to be rotatable;
a handle attached to one end side of the reel body so as to be rotatable;
a motor power unit that has a coupling part attachable to and detachable from a coupling counterpart disposed on other end side of the reel body and is disposed outside the reel body;
a first rotation transmission mechanism that transmits, to the spool, a driving force due to rotation of the handle; and a second rotation transmission mechanism that transmits, to the spool, a driving force of the motor power unit input therefrom through the coupling part coupled with the coupling counterpart,
wherein a magnet is disposed on one of the coupling part and the coupling counterpart, and a magnet or a ferromagnetic material is disposed on other thereof.

2. The fishing reel according to claim 1,
wherein one of the coupling part and the coupling counterpart is provided with an insertion-engagement projection, and other thereof is provided with an insertion-engagement recess, and
wherein the insertion-engagement projection is inserted in and engaged with the insertion-engagement recess in a state in which the coupling part and the coupling counterpart are coupled with one another, thus stabilizing the coupling of the coupling part and the coupling counterpart.

3. The fishing reel according to claim 1,
wherein an end of a rotary shaft included in the second rotation transmission mechanism is disposed in the coupling counterpart in a manner of being exposed therefrom,
wherein an end of a flexible shaft included in the motor power unit is disposed in the coupling part in a manner of being exposed therefrom, and
wherein the end of the rotary shaft and the end of the flexible shaft are engaged with one another in a state in which the coupling part is coupled with the coupling counterpart, thus transmitting the driving force of the motor power unit to the rotary shaft, the driving force being a turning force of the flexible shaft.

4. The fishing reel according to claim 3,
wherein clutch members each having at least two claws formed thereon are disposed on the end of the rotary shaft and the end of the flexible shaft, respectively,
wherein each of the claws of each of the clutch members has a vertical surface substantially perpendicular to a rotational direction of the clutch member and an inclined surface descending from a tip side of the vertical surface to a base side of the clutch member, and
wherein the claws of the clutch member on the flexible shaft and the claws of the clutch member on the rotary shaft are engaged with one another such that their vertical surfaces face one another, thus transmitting the turning force of the flexible shaft to the rotary shaft.

5. The fishing reel according to claim 1, comprising a lock mechanism that maintains a state in which the coupling part and the coupling counterpart are coupled with one another,
wherein the lock mechanism is configured to switch a locked state in which reinforcement is performed to maintain the coupling of the coupling part and the coupling counterpart, the coupling being performed magnetically, and an unlocked state in which the coupling of the coupling part and the coupling counterpart is performed only magnetically.

6. The fishing reel according to claim 1, comprising an operation unit that is disposed outside the reel body and changes the driving force of the motor power unit,
wherein the operation unit is configured to be set at a position desired by a user so as to be usable.

7. The fishing reel according to claim 6, comprising a plurality of operation units each being the operation unit.

8. The fishing reel according to claim 6, wherein the operation unit includes a throttle lever for adjusting the driving force of the motor power unit and is configured to change the driving force according to a draw amount of the throttle lever.

9. The fishing reel according to claim 6, wherein the operation unit includes a dial for adjusting the driving force of the motor power unit and is configured to change the driving force according to a rotational movement amount of the dial.

10. The fishing reel according to claim 6, wherein the operation unit includes a push switch for adjusting the driving force of the motor power unit and is configured to change the driving force according to a push amount of the push switch.

11. The fishing reel according to claim 6, comprising a plurality of operation units each being the operation unit,
wherein the plurality of operation units is any combination of operation units selected from:
an operation unit that includes a throttle lever for adjusting the driving force of the motor power unit and is configured to change the driving force according to a draw amount of the throttle lever;
an operation unit that includes a dial for adjusting the driving force of the motor power unit and is configured to change the driving force according to a rotational movement amount of the dial; and
an operation unit that includes a push switch for adjusting the driving force of the motor power unit and is configured to change the driving force according to a push amount of the push switch.

* * * * *